May 23, 1933.  A. LÖHR ET AL  1,910,027
BOTTOM FOR REACTION TOWERS
Filed Oct. 4, 1930
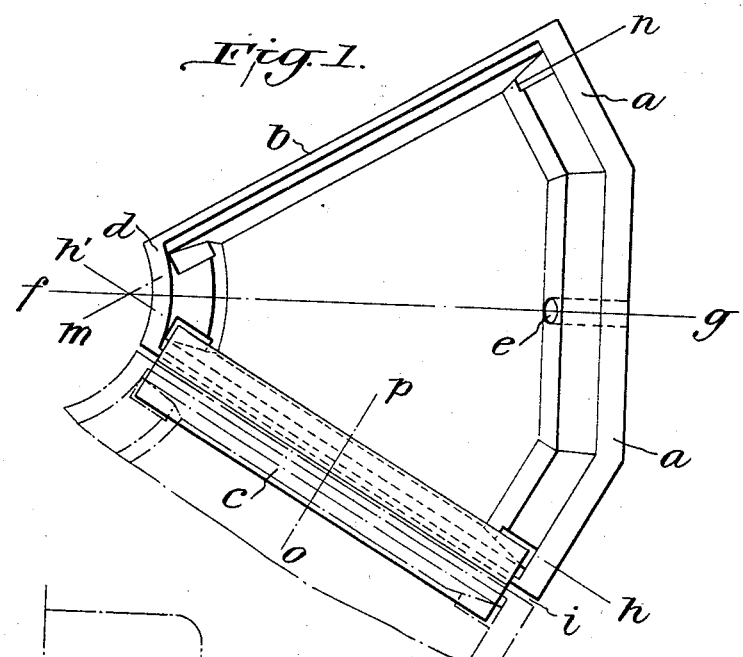
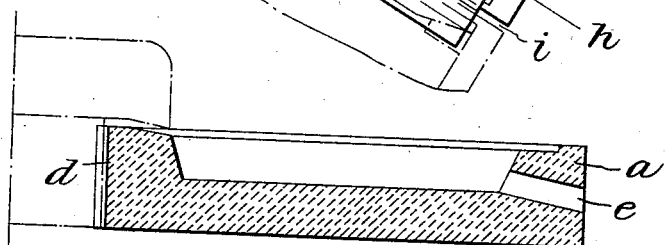
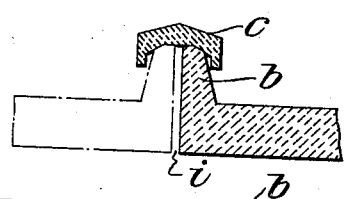
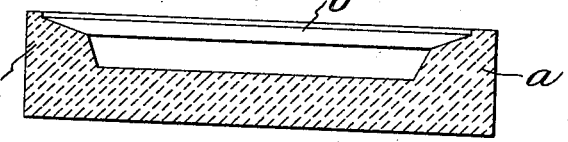
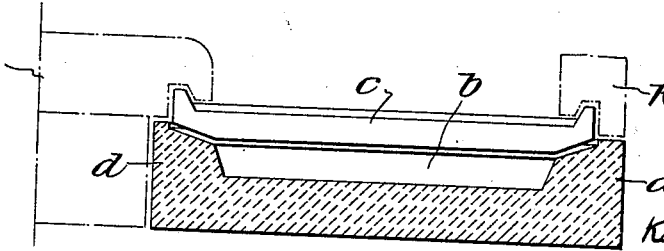
Inventors:
Adolf Löhr
Karl Gebhardt
By Byrnes Townsend & Potter
Their Attorneys.

Patented May 23, 1933

1,910,027

UNITED STATES PATENT OFFICE

ADOLF LÖHR AND KARL GEBHARDT, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY

BOTTOM FOR REACTION TOWERS

Application filed October 4, 1930, Serial No. 486,477, and in Germany October 7, 1929.

The present invention relates to bottoms for reaction towers. In order to produce a reaction between gases and circulating liquids, towers made of natural stones are often used in the chemical industry. In view of the dimensions of these towers it is impossible to make the bottom of one piece, this part of the tower being that which is subjected to most stress.

The bottoms are, therefore, made up of segmental portions which together form a cup for the circulating liquid. The segments are held together by bands and according to the purpose for which the towers are to be used, the joints are filled up and caulked with cements resistant to acids and alkalies or with asbestos, mixing with a binding agent. Nevertheless, the joints which are exposed to chemical attack, to the washing-out effect and to a certain hydrostatic pressure of the circulating liquid, are liable to become leaky so that repairs are often necessary. According to this invention each segment of the bottom is itself a cup having a rim of considerable height, the joints between the segments being protected against access of the liquid by covers which overlap the upper surface of the adjacent rims of contiguous cups.

The construction will be apparent from the following description with reference to the accompanying drawing in which Fig. 1 is a plan of one segmental cup of a bottom which is composed of six such cups.

Fig. 2 is a section on line $f$—$g$ of Fig. 1.

Fig. 3 is a section on line $o$—$p$ of Fig. 1.

Fig. 4 is a section on line $m$—$n$ of Fig. 1 and

Fig. 5 is a section on line $h'$—$h$ of Fig. 1, the cover, which is another feature of the invention, being shown in elevation.

For the purpose of completely protecting the joints which hitherto were attacked most, from any contact with the liquid each of the segments forming the bottom of the reaction tower is provided on every side with a rim, so that each has the form of a cup. The rims are of such height that the total capacity of the cups suffices to receive the entire quantity of the liquid circulating in the tower when the circulation is stopped so that the liquid is prevented from overflowing the rims or creeping up the walls and over the rims. Each cup has an outlet for discharging the liquid. At the center of the tower the segments are truncated so that there is a space which is covered by a central plate resting on the rims. Those portions of the rims of the segmental cups which are not situated underneath the wall plates of the tower and the central plate, namely the radial rims, are provided with cover plates having at their ends upstanding flanges engaged by undercut portions of the wall plates and of the central plate respectively; they are thus protected from the action of the circulating liquid. The adjacent radial rims are protected by the said covers from the trickling liquid.

In the accompanying drawing $a$ is the circumferential rim of the cup. $b$ is the radial rim and $d$ is the rim at the center. All these rims are of the same height. The radial rims are cemented to the corresponding rims of the adjacent cups, the cement joint $i$ being protected by the cover $c$. The central cover $l$ rests on the rims $d$, and the wall plates of the tower rest on the rims $a$; $e$ is the outlet of the cup.

The cover $c$ has an upstanding flange on one end of it which engages with an undercut portion of the lowest plate $k$ of the tower wall, and a like flange at the other end which engages with an undercut portion of the central plate $l$; in each case there is a slight clearance in the engagement in order to prevent undue loading of the cover $c$.

Bottoms constructed as described are intended to be used in large towers for acid reactions and in all kinds of towers in which the aforesaid difficulties arise at the joints.

We claim:

1. A segmental portion of natural stones for bottoms of reaction towers having the shape of a cup with a high rim all around it.

2. A bottom for reaction towers made up of segmental portions of natural stones, wherein each segmental portion has the shape of a cup with a high rim all around it, the joints between the segmental portions being protected against access of the liquid by covers which overlap the upper surfaces of the adjacent rims of contiguous cups.

In testimony whereof, we affix our signatures.

ADOLF LÖHR.
KARL GEBHARDT.